(12) United States Patent
Andou

(10) Patent No.: US 7,386,748 B2
(45) Date of Patent: Jun. 10, 2008

(54) INFORMATION PROCESSING APPARATUS AND CONTROL METHOD

(75) Inventor: Hideaki Andou, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/584,381

(22) Filed: Oct. 19, 2006

(65) Prior Publication Data

US 2007/0201198 A1    Aug. 30, 2007

(30) Foreign Application Priority Data

Feb. 28, 2006   (JP) .............................. 2006-051526

(51) Int. Cl.
G06F 1/00     (2006.01)
G06F 1/16     (2006.01)
H05K 5/00     (2006.01)
H05K 7/00     (2006.01)
H05K 7/16     (2006.01)

(52) U.S. Cl. ...................... 713/330; 361/680; 361/681; 361/683; 361/725

(58) Field of Classification Search ................ 361/680, 361/681, 683, 725; 345/84, 87, 156, 158, 345/173, 905; 700/17, 22, 83, 247; 713/300, 713/320, 324, 330; 349/1, 58
See application file for complete search history.

(56) References Cited

U.S. PATENT DOCUMENTS

| | | | | |
|---|---|---|---|---|
| 6,044,473 A | * | 3/2000 | Kim | 713/320 |
| 6,154,359 A | * | 11/2000 | Kamikakai et al. | 361/681 |
| 6,760,851 B2 | | 7/2004 | Teshima et al. | |
| 6,813,156 B2 | * | 11/2004 | Park | 361/725 |
| 6,906,698 B2 | * | 6/2005 | Tachikawa et al. | 345/156 |
| 7,203,058 B2 | * | 4/2007 | Hong | 361/681 |
| 2004/0030943 A1 | * | 2/2004 | Ishidera et al. | 713/320 |
| 2004/0133817 A1 | * | 7/2004 | Choi | 713/300 |
| 2006/0078321 A1 | * | 4/2006 | Osawa et al. | 396/6 |
| 2006/0139326 A1 | * | 6/2006 | Tsukamoto | 345/158 |
| 2006/0192770 A1 | * | 8/2006 | Suzukawa | 345/173 |

FOREIGN PATENT DOCUMENTS

CN    1515975 A    7/2004
JP    11167432 A  *  6/1999

(Continued)

OTHER PUBLICATIONS

Chinese Office Action dated Mar. 14, 2008 for application No. 200610172414.8 (Corresponding U.S. Appl. No. 11/584,381) entitled Information Processing Apparatus and Control Method. English Translation.

*Primary Examiner*—Crystal J. Barnes
(74) *Attorney, Agent, or Firm*—Blakely, Sokoloff, Taylor & Zafman

(57) ABSTRACT

According to one embodiment, an information processing apparatus includes a display device, a main body rotatably connected to the display device and overlapping so as to at least partly face the display device, and a plurality of input devices either on the main body or the display device and covered with the display device when the display device is overlapped. When the display device rotates in a direction of overlapping onto the main body, supply of power source to the operating means is switched off stepwise in an order set in advance, in accordance with an angle between the display device and the main body.

14 Claims, 6 Drawing Sheets

FOREIGN PATENT DOCUMENTS

| | | | |
|---|---|---|---|
| JP | 11338575 A | * | 12/1999 |
| JP | 2002215267 A | * | 7/2002 |
| JP | 2002288974 A | * | 10/2002 |
| JP | 2005-151057 | | 9/2005 |
| JP | 2005-286431 | | 10/2005 |
| JP | 2005-347903 | | 12/2005 |

* cited by examiner

INFORMATION PROCESSING APPARATUS AND CONTROL METHOD

CROSS-REFERENCE TO RELATED APPLICATIONS

This application is based upon and claims the benefit of priority from the prior Japanese Patent Application No. 2006-51526, filed Feb. 28, 2006, the entire contents of which are incorporated herein by reference.

BACKGROUND

1. Field

Embodiments of the present invention relate to a power-saving technology for notebook computers, and in particular to an information processing apparatus and a control method by which supply of power source to respective operating equipment can be controlled in accordance with a state of opening and closing of a display.

2. Description of the Related Art

Previously, there has been a technology in which, in a notebook personal computer, an internal power supply, an external power supply, and a system power supply are switched On/OFF based on the detected angle between a main body unit of the computer and its rotational display unit.

In the technology described above, however, it is sometimes difficult or impossible to operate various switches and devices when the angle between the display unit and the main body unit is below a predetermined angle. Thus, when the display unit is in various angular positions, power is consumed needlessly.

DETAILED DESCRIPTION

Hereinafter, embodiments of the present invention will be described with reference to the drawings.

First Embodiment

Figure 1:
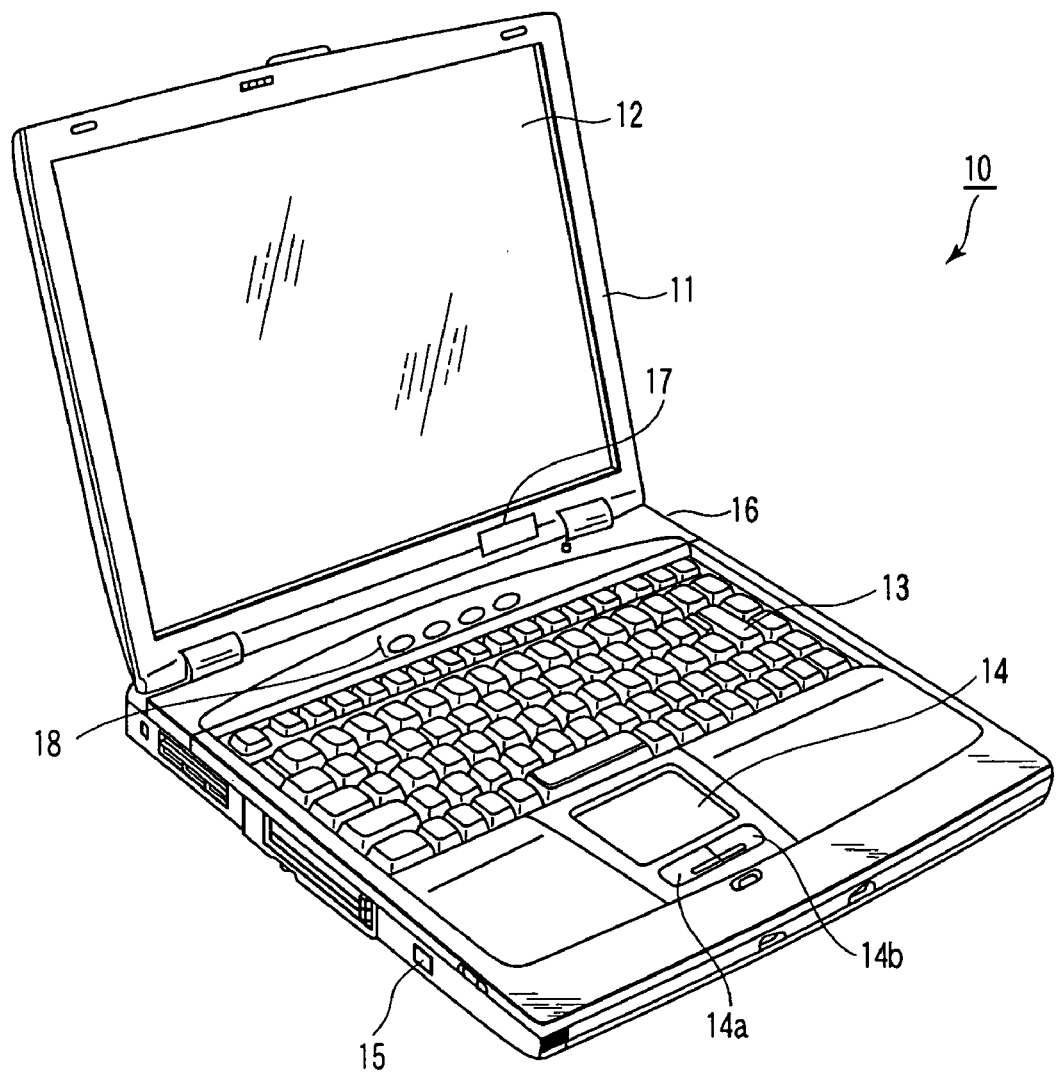
FIG. 1 is an exemplary perspective view showing a notebook computer which is an information processing apparatus according to a first embodiment of the invention.

FIG. 1 is a perspective view of an information processing apparatus according to a first embodiment of the present invention. The information processing apparatus is realized as a notebook computer 10 which can be driven by a battery.

As shown in FIG. 1, the computer 10 is configured of a main body 16 and a display 11. A display device composed of a liquid crystal display (LAD) is built into the display 11, and a display screen 12 of the LAD is positioned in substantially the center of the display 11.

The display 11 is attached to main body 16 so as to be freely opened and closed between a release position and a lock up position with respect to the computer 10. The main body side of the computer 10 has a thin box type housing. A plurality of input devices are positioned on a top surface of the main body 16. For instance, a keyboard 13 is arranged on a top surface of the housing, and a touch pad 14, left and right two buttons 14a and 14b, and various short cut buttons 18 such as mail and the like are arranged on a palm rest. Further, an optical drive 15 and the like are provided at the side faces of the main body 16. Moreover, a fingerprint authentication device 17 is arranged at a lower portion of the display 11.

Figure 2:
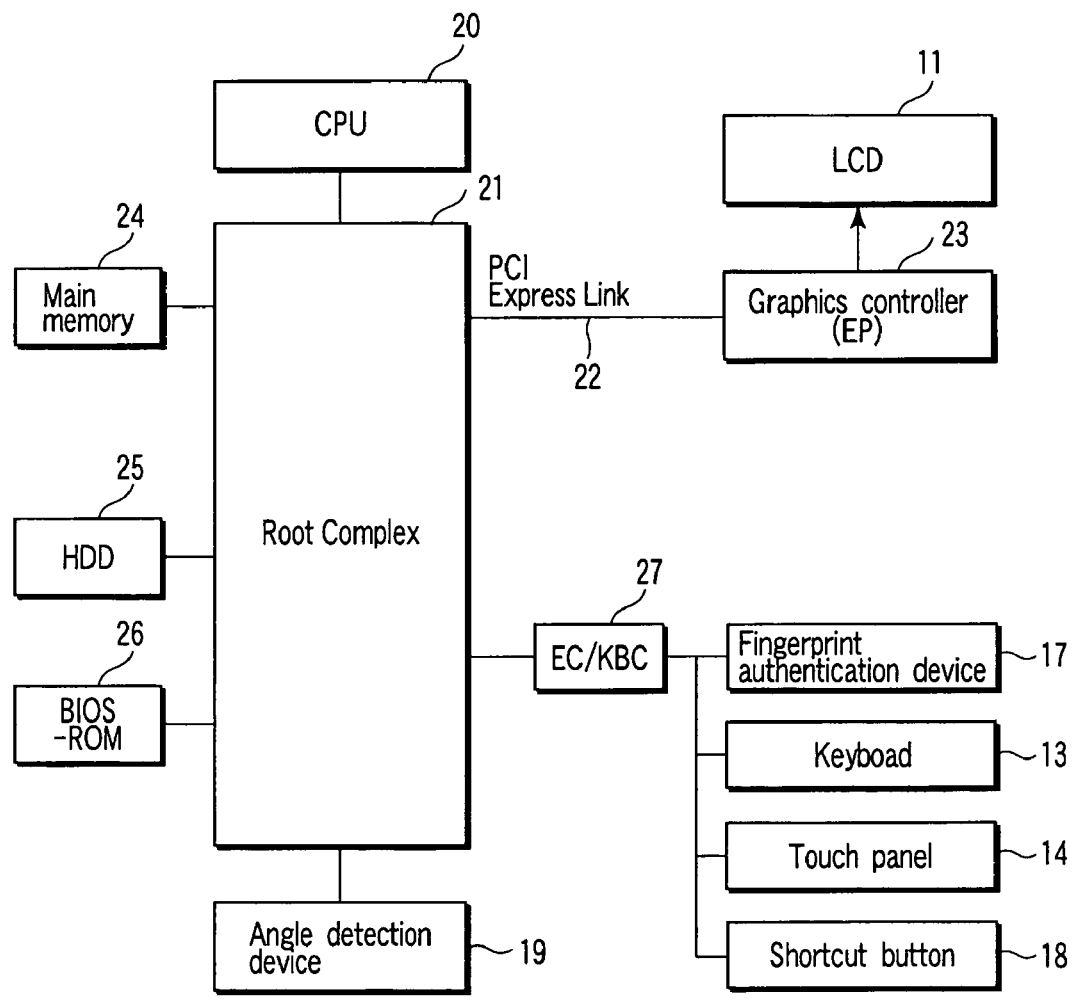
FIG. 2 is an exemplary block diagram showing a configuration of the notebook computer which is the information processing apparatus according to the first embodiment of the invention.

FIG. 2 is a block diagram showing a configuration of the computer.

The computer 10 includes a central processing unit (CPU) 20, a Root Complex 21, a main memory 24, a graphics controller (End Point) 23, a PHI Express Link 22 which connects the Root Complex 21 and the graphics controller 23, the display 11, an embedded controller/keyboard controller IC (EBC/KBC) 27, a hard disk drive (HDD) 25, a BIOS-ROM 26, and the fingerprint authentication device 17, the keyboard 13, the touch pad 14, and various shortcut buttons 18 which are input devices connected to the EBC/KBC 27, and an angle detection device 19 which detects an angle between the main body 16 and the display 11.

The Root Complex 21, the graphics controller 23, and the like are devices compliant with the PHI EXPRESS standard. Communication between the Root Complex 21 and the graphics controller 23 is achieved via the PHI® EXPRESS® Link 22 arranged between the Root Complex 21 and the graphics controller 23.

The CPU 20 is a processor which controls operations of the main computer 10, and executes various programs (an operating system, application programs) loaded in the main memory 24 from the HDD 25. Further, the CPU 20 also executes a basic input output system (BIOS) stored in the BIOS-ROM 26. The BIOS is a program for controlling hardware.

The Root Complex 21 is a bridge device which makes a connection between a local bus of the CPU 20 and the graphics controller 23. Further, the Root Complex 21 also has a function of controlling communications with the graphics controller 23 via the PHI® EXPRESS® Link 22.

The graphics controller 23 is a display controller which controls the display 11 used as a display monitor of the main computer.

The EBC/KBC 27 is a one-chip microcomputer in which an embedded controller for managing power and a keyboard controller for controlling the keyboard 13, the touch pad 14 and the like are integrated. The EBC/KBC 27 has a function of turning power-ON/OFF of the main computer 10 in cooperation with a power supply controller depending on an operation of a power button by a user.

Figure 3:
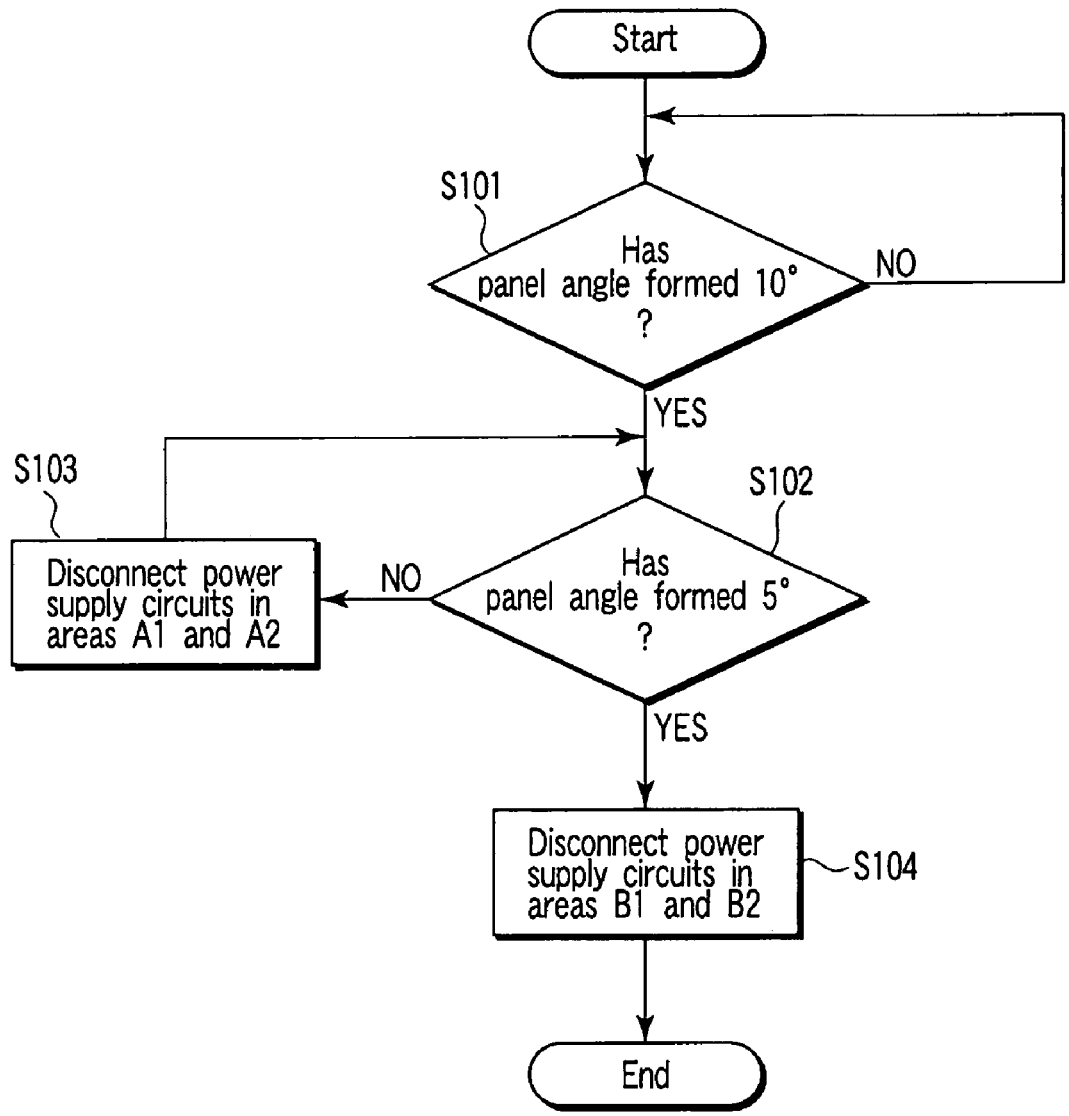
FIG. 3 is an exemplary flowchart for explanation of a method of controlling the information processing apparatus according to the first embodiment of the invention.

Next, a method of controlling an information processing apparatus according to the first embodiment of the invention will be described with reference to a flowchart of FIG. 3.

Note that, in the present embodiment, an operation of closing the panel from a state in which the display (hereinafter called a panel) 11 is opened will be described with reference to the flowchart of FIG. 3.

Figure 4:
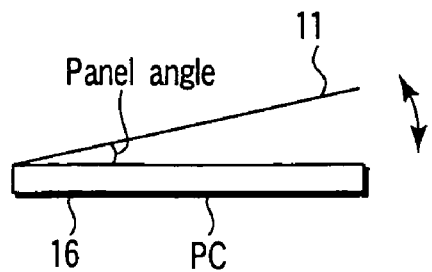
FIG. 4 is an exemplary schematic view showing an angle of a panel with a main body.
Figure 5:
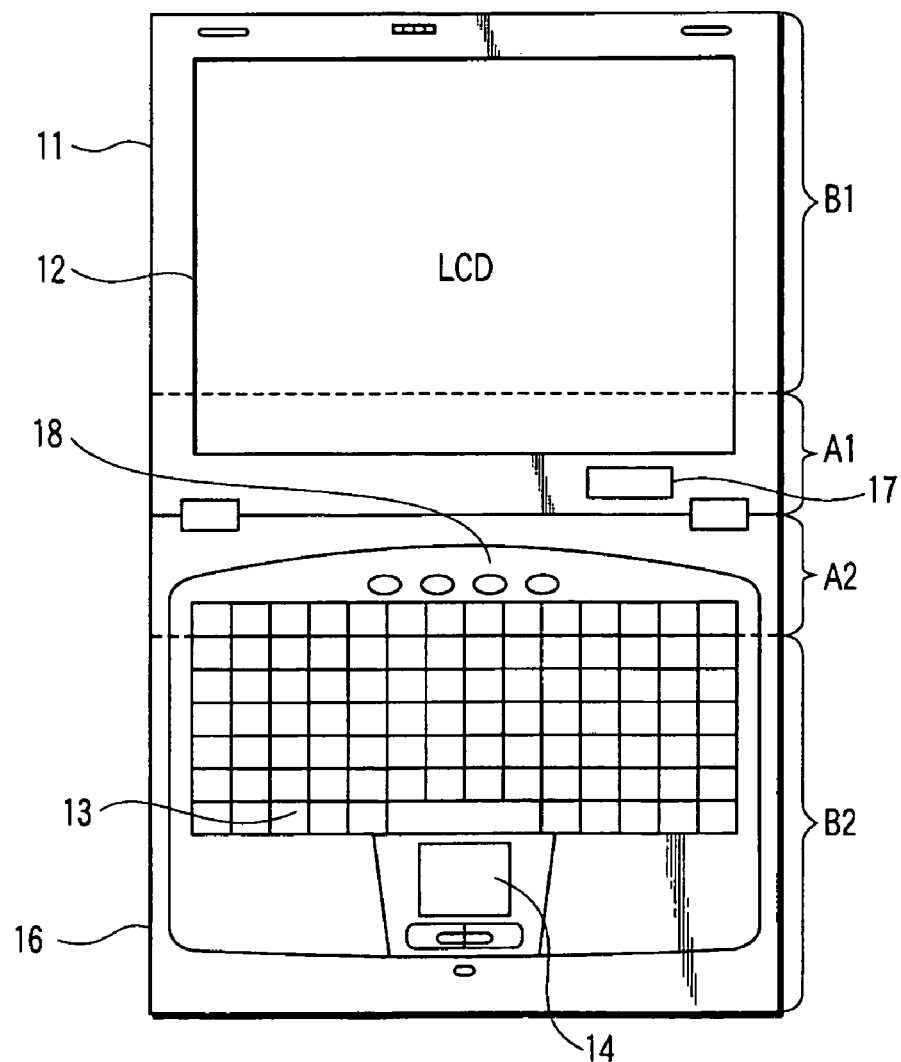
FIG. 5 is an exemplary schematic view showing setting areas of various switches and devices which are arranged at the main body and the panel of the computer according to the first embodiment of the invention.

The CPU 20 of the computer 10 determines whether or not an angle of the panel 11 forms, for example, 10° with the main body 16 on the basis of information from the angle detection device 19 (block S101: refer to FIG. 4). When the CPU 20 determines in block S101 that the angle of the panel 11 forms 10° with the main body 16 (YES in block S101), it is determined whether or not the angle of the panel 11 forms 5° with the main body 16 (block S102). When the CPU 20 determines that the angle of the panel 11 does not form 5° with the main body 16 (NO in block S102), supply of power source to the fingerprint authentication device 17, the various shortcut buttons 18, and some of the upper portion of the keyboard 13 which are arranged in the areas of areas A1 and A2 shown in FIG. 5 is switched off (block S103). Note that, when supply of power source to these devices is switched off, a plurality of switch units may be provided in one power supply circuit, or a plurality of power supply circuits may be provided.

In summary, according to one embodiment of the invention, the input devices are powered down in a predetermined order based on their proximity to the hinge rotationally coupling display device 11 to main body 16 of FIG. 1. Hence, input devices in areas A1 & A2 of FIG. 5 become inaccessible sooner than input devices in areas B1 & B2 of FIG. 5 as display unit 11 is rotated toward main body 16.

On the other hand, when the CPU 20 determines that the angle of the panel 11 forms 5° with the main body 16 (YES in block S102), supply of power source to the LAD 12, the keyboard 13, and the touch pad 14 which are arranged in the areas of areas B1 and B2 shown in FIG. 5 is switched off (block S104).

Note that setting of areas in which supply of power source is switched off is not limited to the content described above, and can be set in various ways. Further, when devices whose operations are limited in accordance with an angle between the panel 11 and the main body 16 are mounted in addition to the devices such as the touch pad 14 shown in the present embodiment, the effect of the present invention can be enjoyed by applying the present invention to those devices in the same way.

Figure 6:
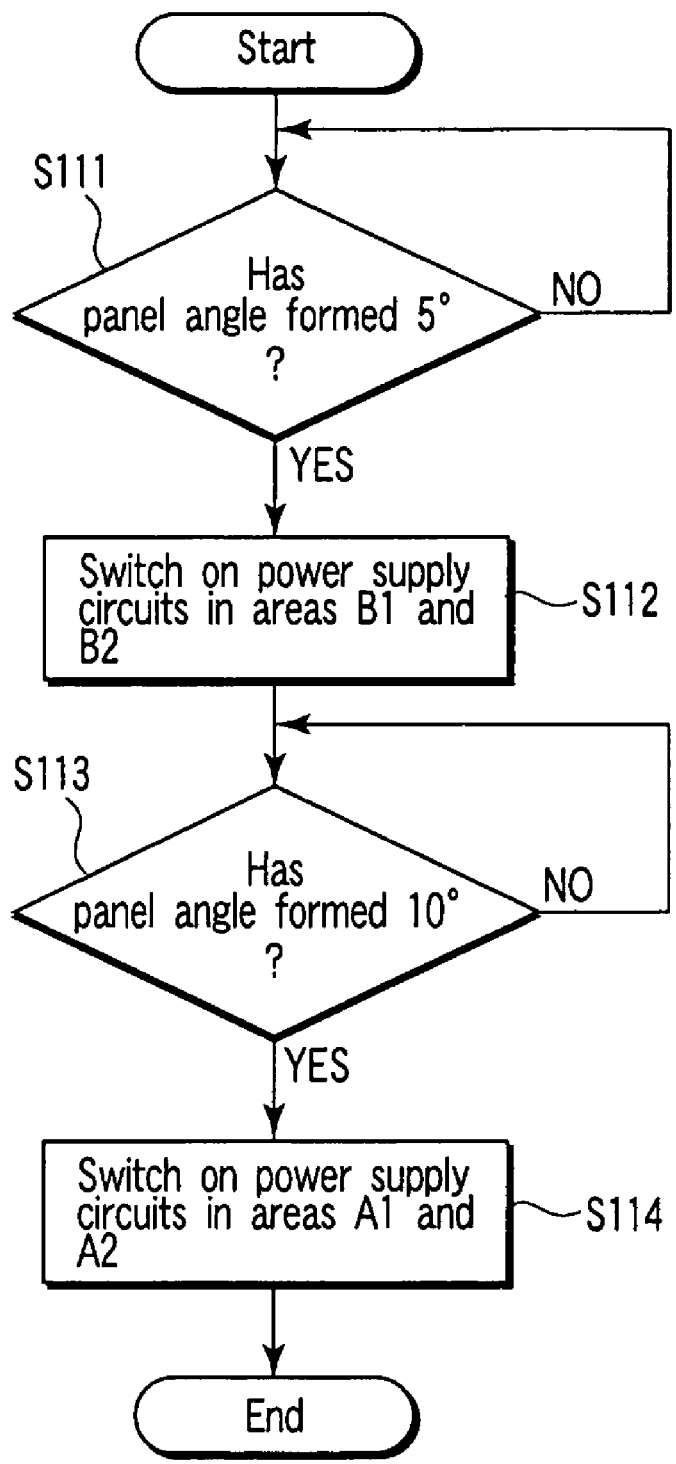
FIG. 6 is an exemplary flowchart for explanation of a method of controlling an information processing apparatus according to a second embodiment of the invention.

Next, an operation of opening the panel from a state in which the panel 11 is closed will be described with reference to a flowchart of FIG. 6.

The CPU 20 of the computer 10 determines whether or not an angle of the panel 11 forms, for example, 5° with the main body 16 on the basis of information from the angle detection device 19 (block S111: refer to FIG. 4). When the CPU 20 determined in block S111 that the angle of the panel 11 forms 5° with the main body 16 (YES in block S111), supply of power source to the LAD 12, the keyboard 13, and the touch pad 14 which are arranged in the areas of the areas B1 and B2 shown in FIG. 5 is switched on (block S112).

Moreover, the CPU 20 determines whether or not the angle of the panel 11 forms 10° with the main body 16 (block S113). When the CPU 20 determines that the angle of the panel 11 forms 10° with the main body 16 (YES in block S113), supply of power source to the fingerprint authentication device 17, the various shortcut buttons 18, and some of the upper portion of the keyboard 13 which are arranged in the areas of the areas A1 and A2 shown in FIG. 5 is switched on (block S114).

In accordance with the above embodiment, it is possible to switch off supply of power source to the various switches and the devices which are made impossible to operate due to the various switches and the devices provided to the main body unit being hidden, stepwise in accordance with an angle of the display unit. On the other hand, it is possible to switch on supply of power source to the various switches and the devices stepwise when the various switches and the devices provided to the main body unit are made possible to operate.

Second Embodiment

Next, a second embodiment of the present invention will be described with reference to FIGS. 7 and 8.

Figure 7:
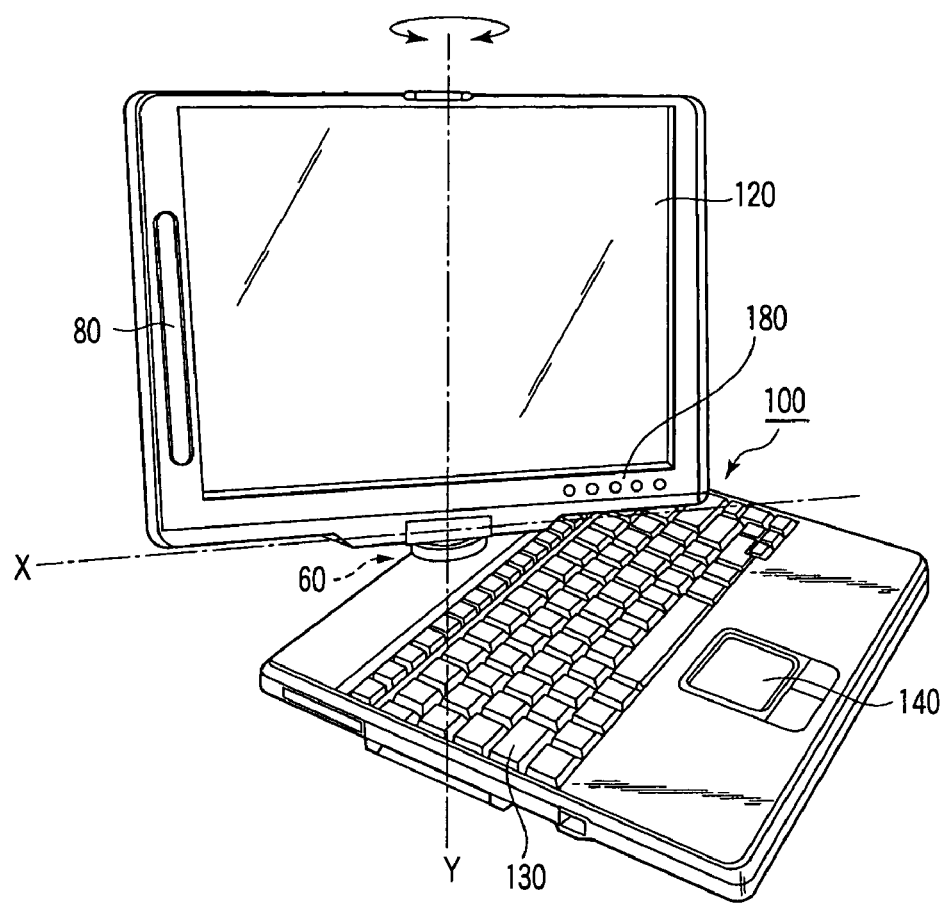
FIG. 7 is an exemplary perspective view showing a notebook tablet PC which is the information processing apparatus according to the second embodiment of the invention.
Figure 8:
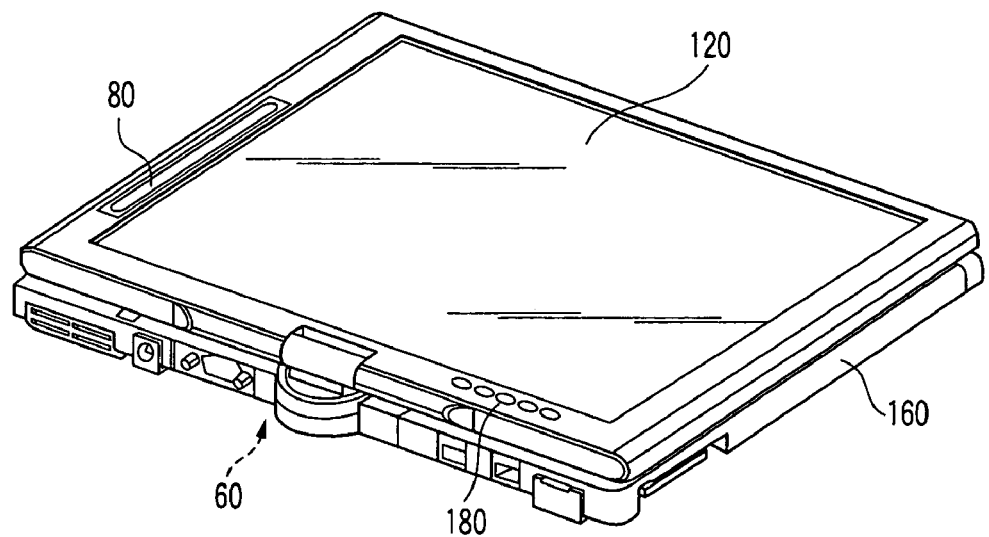
FIG. 8 is an exemplary perspective view showing a tablet style of the notebook tablet PC which is the information processing apparatus according to the second embodiment of the invention.

FIG. 7 is a perspective view showing a notebook tablet PC serving as an information processing apparatus according to the second embodiment of the invention.

A tablet PC 100 is configured by: a main body 160 having a keyboard 130, a touch pad 140, a hinge portion 60 serving as a connection portion with a liquid-crystal system movable display 120, and the like; and the display 120 connected so as to be movable to the hinge portion 60 having various buttons 180. In the tablet PC 100, the display 120 is made to be a touch panel, and it is possible to directly carry out operations with respect to the display 120 by a stylize 80 or the like.

The display 120 is rotatable centering around Y-axis on the hinge portion 60. Further, the display 120 can be reclined centering around X-axis. For example, when the display 120 is reclined with the display surface thereof up, the tablet PC 100 is made to be a tablet style as shown in FIG. 8. In a case of using the tablet style in this way, for example, a pattern is acceptable in which two users utilize it while looking at the display 120.

Also when the tablet PC 100 is used, setting can be made such that the areas A1, A2, B1, and B2 described in the first embodiment, or the like are provided, and supply of power source is switched on/off depending on an angle between the display 120 and the main body 160 every area. Consequently, the same effect as that of the first embodiment described above can be achieved.

In the same way, when devices whose operations are limited in accordance with an angle between the display 120 and the main body are mounted in addition to the devices shown in the embodiment, the effect of the present invention can be achieved by applying the invention to those devices in the same way.

Further, the invention is not limited to the above-described embodiments, and at the stage of implementing the invention, the invention can be embodied by modifying components within a range without departing from the gist of the present invention. Further, various inventions can be made by appropriate combinations of a plurality of components disclosed in the above-described embodiments. For example, some components may be eliminated from all the components shown in the embodiments. Moreover, the components over the different embodiments may be appropriately combined.

What is claimed is:

1. An information processing apparatus comprising:
   a display device;
   a main body rotationally coupled to the display device, a top surface of the main body increasingly overlapping the display device when the display device rotates in a first direction;
   a hinge rotationally coupling the display device to the main body;
   a plurality of input devices arranged either at the top surface of the main body or on the display device, the plurality of input devices being covered by the display device as the display device rotates in the first direction; and
   means for switching off power supplied to the plurality of input devices stepwise in a predetermined order by powering off a first input device of the plurality of input devices before powering off a second input device that is situated further away from the hinge than the first input device, the predetermined order is based on an angle between the display device and the main body that changes as the display device is rotated in the first direction.

2. The information processing apparatus according to claim 1, wherein the predetermined order is set to be an order of input devices that become more difficult to operate as the display device rotates in the first direction.

3. The information processing apparatus according to claim 1, wherein the plurality of input devices includes at least two of a keyboard, a touch pad, shortcut buttons, and a fingerprint authentication device.

4. An information processing apparatus comprising:
   a display device;
   a main body rotationally coupled to the display device, the main body overlapping a lesser area of the display device as the display device is rotated in a first direction away from the main body;
   a plurality of input devices arranged either along a top surface of the main body or on the display device and are uncovered by the display device when the display device is rotated in the first direction; and
   means for switching on a supply of power to the plurality of operating input devices stepwise in a predetermined order based on an angle between the display device and the main body, the stepwise order includes switching on the supply of power to a first input device before switching on the supply of power to a second input device, the first input device being further from a rotational coupling point between the main body and the display device than the second input device.

5. The information processing apparatus according to claim 4, wherein the predetermined order is set to be an order of input devices that are becoming accessible by a space created between the display device and the main body as the display device rotates in a direction away from the main body.

6. The information processing apparatus according to claim 4, wherein the plurality of input devices include at least two of a keyboard, a touchpad, shortcut buttons, and a fingerprint authentication device.

7. The information processing apparatus according to claim 4, wherein the display device is connected rotatably so a top surface main body and a bottom surface of the display device are adjacent to each other when the display device is overlapping the main body.

8. A method of controlling an information processing apparatus including a main body and a display device rotatably coupled to the main body, the method comprising:
   determining an angle between the display device and the main body;
   determining whether any input devices of a plurality of input devices is to be powered down based on the determined angle; and
   switching off a supply of power applied to the input devices in a stepwise predetermined order based on a location of the input devices, the stepwise predetermined order comprises switching off the supply of power to a first input device of the plurality of input devices before switching off the supply of power to a second input device of the plurality of input devices, the first input device being closer to a rotational coupling point between the main body and the display device than the second input device.

9. The method according to claim 8, further comprising:
   switching on the supply of power to the input devices in an order that is opposite the stepwise, predetermined order.

10. The method according to claim 9, wherein the switching on the supply of power comprises:
    switching on the supply of power to a first input device before switching on the supply of power to a second input device, the first input device being further from a rotational coupling point between the main body and the display device than the second input device.

11. The method according to claim 10, wherein the switching on the supply of power further comprises:
    switching on the supply of power to the second input device before switching on the supply of power to a third input device, the second input device being further from the rotational coupling point than the third input device.

12. The method according to claim 8, wherein the switching off the supply of power further comprises:
    switching off the supply of power to the second input device before switching off the supply of power to a third input device, the second input device being closer to the rotational coupling point than the third input device.

13. A method of controlling an information processing apparatus including a main body and a display device rotatably coupled to the main body, the method comprising:
    determining an angle between the display device and the main body;
    determining whether any input devices of a plurality of input devices is to be powered down based on the determined angle; and
    switching on a supply of power to the plurality of operating input devices stepwise in a predetermined order based on a location of the input devices, the switching on the supply of power comprises switching on the supply of power to a first input device of the plurality of input devices before switching on the supply of power to a second input device of the plurality of input devices, the first input device being further from a rotational coupling point between the main body and the display device than the second input device.

14. The method according to claim 13, wherein the switching on the supply of power further comprises:
    switching on the supply of power to the second input device before switching on the supply of power to a third input device, the second input device being further from the rotational coupling point than the third input device.

* * * * *